(12) United States Patent
Tang

(10) Patent No.: US 6,898,021 B1
(45) Date of Patent: May 24, 2005

(54) MOTIONLESS ZOOM LENS

(76) Inventor: Yin S. Tang, 201 Rockview, Irvine, CA (US) 92612

( * ) Notice: Subject to any disclaimer, the term of this patent is extended or adjusted under 35 U.S.C. 154(b) by 0 days.

(21) Appl. No.: 10/741,968

(22) Filed: Dec. 18, 2003

(51) Int. Cl.$^7$ .............................. G02B 1/06; G02F 1/13
(52) U.S. Cl. ....................... 359/666; 359/676; 349/200
(58) Field of Search ................................. 359/676–692, 359/666, 652–654; 349/200

(56) References Cited

U.S. PATENT DOCUMENTS

| | | | | |
|---|---|---|---|---|
| 4,407,567 A | * | 10/1983 | Michelet et al. | 359/676 |
| 5,117,309 A | * | 5/1992 | Aoki | 356/654 |
| 5,644,434 A | | 7/1997 | Hagimori | 359/689 |
| 6,111,336 A | | 8/2000 | Yoshida et al. | 310/328 |
| 6,459,535 B1 | * | 10/2002 | Goto | 359/666 |
| 6,626,532 B1 | * | 9/2003 | Nishioka et al. | 351/41 |
| 6,631,035 B2 | | 10/2003 | Iikawa et al. | 359/699 |
| 6,646,815 B2 | | 11/2003 | Nobe | 359/689 |
| 6,657,795 B2 | | 12/2003 | Nishimura et al. | 359/699 |
| 6,661,584 B2 | | 12/2003 | Nishimura | 359/686 |

OTHER PUBLICATIONS

Tunable Fresnel lens using nanoscale polymer–dispersed liquid crystals, by Hongwen Rene et al., Applied Physics Letters, vol. 83, No. 8, Aug. 25, 2003.

Tunable liquid–filled microlens array integrated with microfluidic network, by Nikolas Chronis et al., Optics Express, vol. 11, No. 19, Sep. 22, 2003.

Microlenses immersed in nematic liquid crystal with electrically controlled focal length, by L.G. Commander et al., EOS Topical Digest Meetings Microlens Arrays, vol. 5, 1995, pp. 72–76.

* cited by examiner

Primary Examiner—Georgia Epps
Assistant Examiner—M. Hasan
(74) Attorney, Agent, or Firm—MacPherson Kwok Chen & Heid LLP; Greg J. Michelson

(57) ABSTRACT

Systems and methods are disclosed herein to provide zoom lenses. For example, in accordance with an embodiment of the present invention, a zoom lens is provided with a tunable lens. The focal length of the zoom lens may be varied without mechanically moving or changing the separation between one or more lens components.

19 Claims, 4 Drawing Sheets

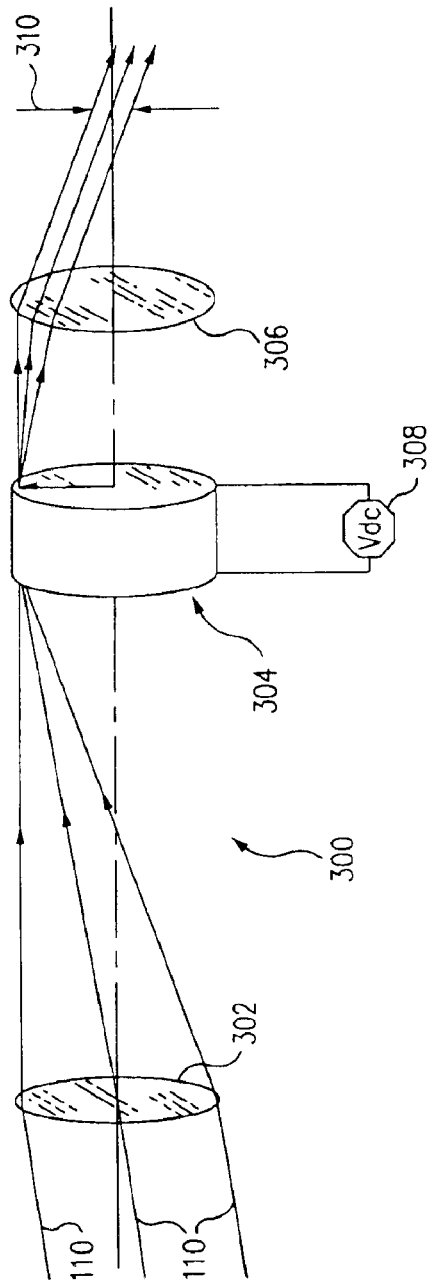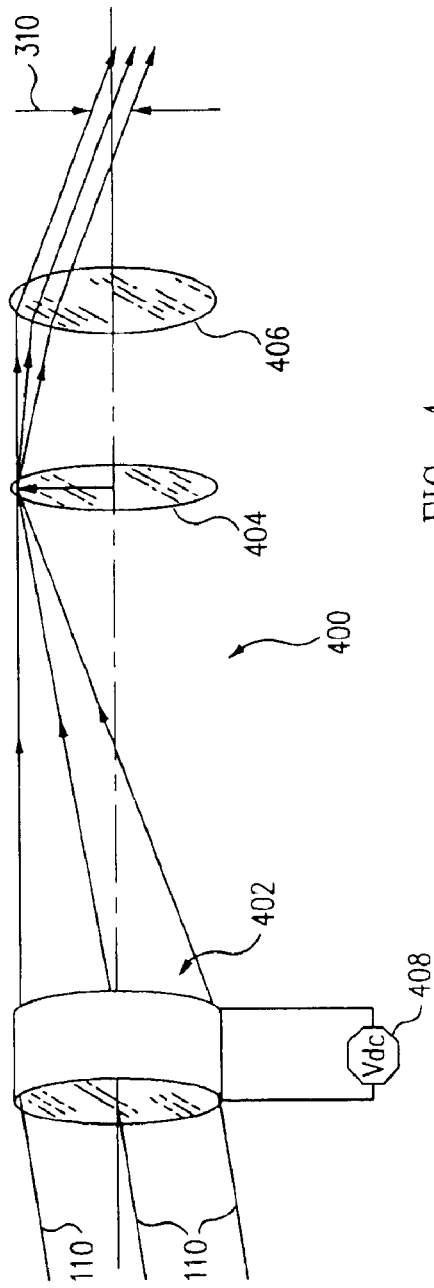
FIG. 3
FIG. 4

MOTIONLESS ZOOM LENS

TECHNICAL FIELD

The present invention relates generally to optical devices and, more particularly, to zoom lenses.

BACKGROUND

A zoom lens (i.e., any type of lens having a variable focal length) is well known and employed in a variety of applications. A conventional zoom lens, for example, may include at least two lens components whose spacing determines the focal length of the zoom lens. As an example, a mechanically compensated zoom lens for a camera may generally arrange the motion of the two components so that an image location or image plane remains constant. As another example, a zoom lens may have an objective lens, an eye lens, and a field lens between the objective lens and the eye lens. By moving the field lens and possibly the objective lens, the focal length of the zoom lens is varied.

One drawback of conventional zoom lenses is that they are often large and heavy, which makes it difficult to incorporate the zoom lens into a small device (e.g., a portable phone, a personal digital assistant (PDA), or a compact camera). Another drawback generally of conventional zoom lenses is that one or more of the lens components must be moved (e.g., mechanically repositioned within the zoom lens) to vary the focal length, which generally requires space and power to accommodate the movement. As an example, with the development and rapid market introduction of small cameras for cellular telephones, PDAs, and compact digital cameras, which typically have strict power requirements and are limited by their battery's capabilities, there is a clear need for an improved zoom lens.

SUMMARY

Systems and methods are disclosed herein to provide zoom lenses. For example, in accordance with an embodiment of the present invention, a zoom lens is provided with a tunable lens. By varying a voltage level applied to the tunable lens, a focal length of the zoom lens is varied. Therefore, the focal length of the zoom lens may be varied without mechanically moving its lens components. Consequently, the zoom lens may offer certain advantages over a conventional zoom lens, such as for example having lower power requirements, no mechanical driving mechanism, and able to be manufactured in a smaller, lighter, and more compact form.

More specifically, in accordance with one embodiment of the present invention, a zoom lens includes a first lens adapted to provide a variable index of refraction; and a second lens, wherein the first lens and the second lens are situated to provide a variable focal length for the zoom lens based on the index of refraction of the first lens.

In accordance with another embodiment of the present invention, an optical device includes a first lens; at least a second lens situated relative to the first lens such that light passes through the first lens and the at least second lens of the optical device; and wherein the first lens is adapted to provide a variable index of refraction to provide a variable focal length for the optical device.

In accordance with another embodiment of the present invention, a method of varying a focal length of a zoom lens includes providing a first lens having a variable index of refraction; providing a second lens; and varying the index of refraction of the first lens to vary the focal length of the zoom lens.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 3 illustrates a zoom lens in accordance with an embodiment of the present invention.

FIG. 4 illustrates a zoom lens in accordance with an embodiment of the present invention.

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
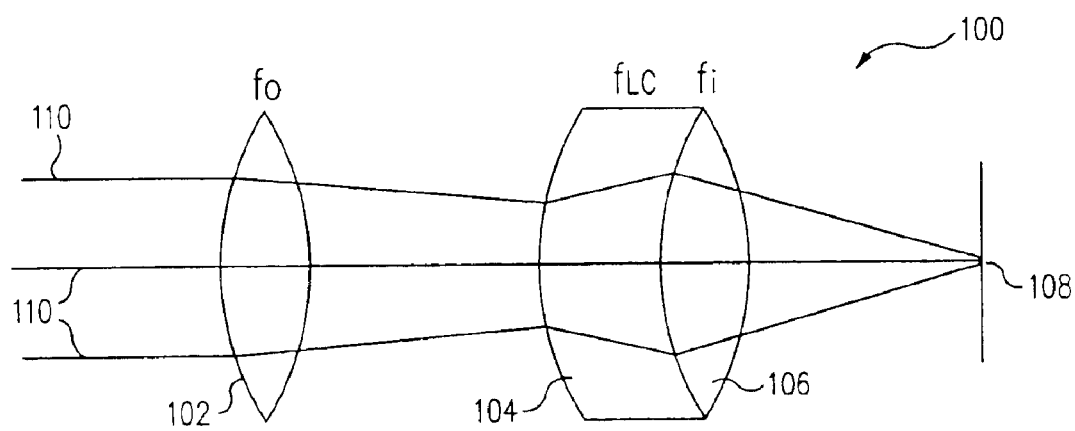
FIG. 1 illustrates a zoom lens in accordance with an embodiment of the present invention.

FIG. 1 illustrates a zoom lens 100 in accordance with an embodiment of the present invention. Zoom lens 100 includes an objective lens 102, a tunable field lens 104, and an imaging lens 106. Objective lens 102 (labeled $f_o$) and imaging lens 106 (labeled $f_i$) may represent a conventional objective lens and a conventional image lens (also referred to as an imaging lens or an eye lens), respectively, and may be made of glass, plastic, or other known conventional lens materials.

Imaging lens 106 may be located adjacent to or formed as part of tunable field lens 104 (labeled $f_{LC}$) Tunable field lens 104, as described in further detail herein, is a lens whose index of refraction may be varied, such as for example by the application of a voltage to tunable field lens 104. By varying the index of refraction of tunable field lens 104, a focal length of zoom lens 100 may be varied.

As illustrated in FIG. 1 as an example, objective lens 102, tunable field lens 104, and imaging lens 106 function, for example, to direct (e.g., magnify) and focus light 110 onto an image plane 108. A user may vary the index of refraction of tunable field lens 104 to change the focal length (which may also be referred to as zoom, magnification, power, or field of view, depending upon the application) of zoom lens 100. In contrast, a conventional zoom lens would generally require one or more of its lens components to be physically moved or repositioned to provide a different focal length.

Because zoom lens 100 does not require its lens components (e.g., objective lens 102, tunable field lens 104, and/or imaging lens 106) to move or be mechanically repositioned to adjust its focal length, zoom lens 100 (along with one or more other embodiments discussed herein) may offer certain advantages over conventional zoom lenses. For example, zoom lens 100 may provide a motionless, compact zoom lens for portable devices (e.g., camera, cellular telephone, or PDA). Zoom lens 100 may be designed to be compact, while still offering, for example, a wide viewing angle and a variable focal length.

Figure 2:
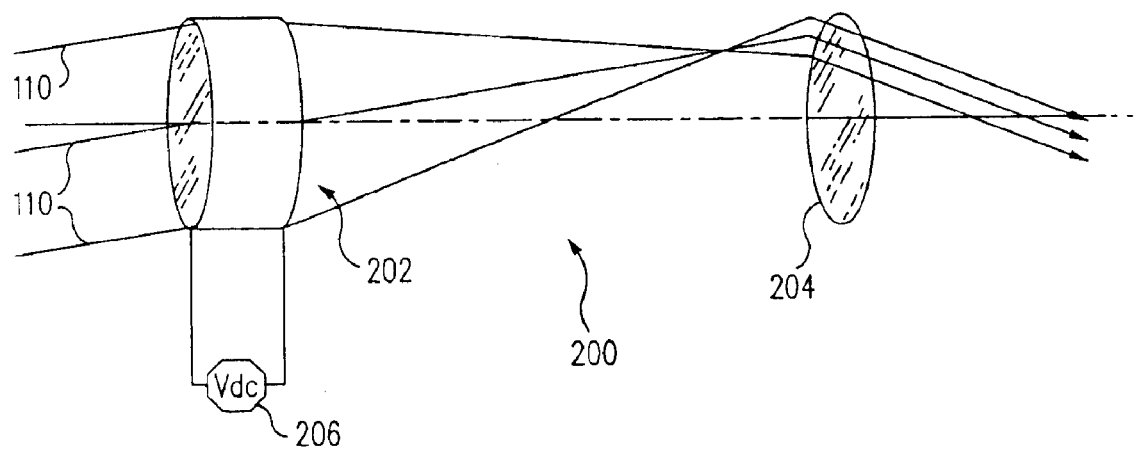
FIG. 2 illustrates a zoom lens in accordance with an embodiment of the present invention.

Zoom lens 100 illustrates an exemplary configuration of lens components, but this configuration is not limiting and it should be understood that the principles of the present invention are applicable to a wide variety of lens configurations and applications for a tunable lens. For example, FIG. 2 illustrates a zoom lens 200 in accordance with an embodiment of the present invention. Zoom lens 200 includes an objective lens 202 and an eye lens 204.

Figure 5A:
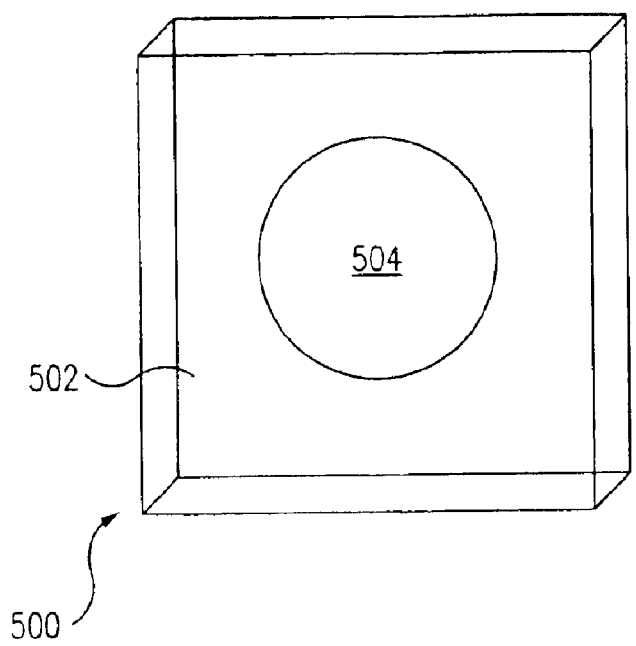
FIGS. 5a and 5b illustrate a top perspective view and a side view of a tunable lens in accordance with an embodiment of the present invention.
Figure 5B:
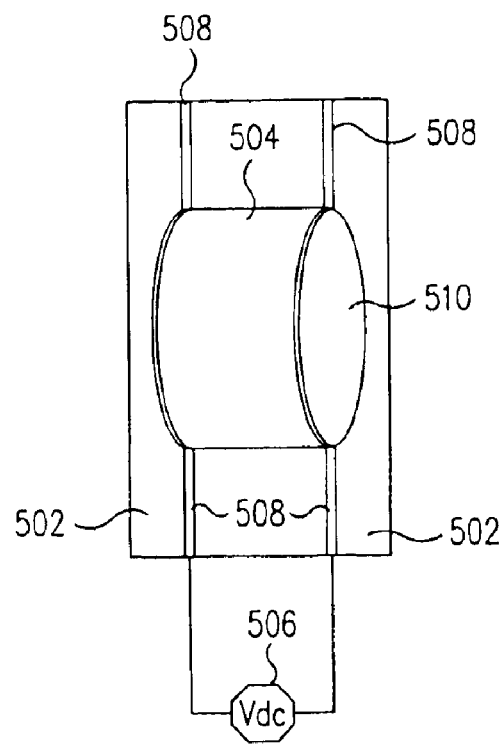

Objective lens 202 is a tunable objective lens, which for example may be tuned by varying a voltage 206 applied to objective lens 202, as discussed in further detail herein (e.g., in reference to FIGS. 5a and 5b). By varying a voltage level of voltage 206, objective lens 202 varies the amount of deflection applied to light 110 (e.g., the index of refraction of objective lens 202 is varied) and, consequently, the amount of zoom or magnification provided by zoom lens 200.

As another example, FIG. 3 illustrates a zoom lens 300 in accordance with an embodiment of the present invention. Zoom lens 300 includes an objective lens 302, a field lens 304, and an eye lens 306. Field lens 304 is a tunable field lens, which is tuned for example by varying a voltage level of a voltage 308 applied to field lens 304. Objective lens 302, field lens 304, and eye lens 306 may be implemented, for example, to function as a motionless zoom lens to provide a variable focal length and direct light 110 onto an image plane 310.

Field lens 304 may be implemented, for example, as a liquid-crystal filled lens whose power is tunable by a voltage level of voltage 308 (i.e., an external bias to field lens 304). By tuning the power of field lens 304, the effective refractive index of field lens 304 is varied and, consequently, the focal length of zoom lens 300 is varied also.

As another example, FIG. 4 illustrates a zoom lens 400 in accordance with an embodiment of the present invention. Zoom lens 400 includes an objective lens 402, a field lens 404, and an eye lens 406. Zoom lens 400 is similar to zoom lens 300 (FIG. 3), but zoom lens 400 provides a tunable objective lens 402 rather than tunable field lens 304 (FIG. 3).

Objective lens 402 is tunable by the application of a voltage 408, with an index of refraction of objective lens 402 varied as a voltage level of voltage 408 is varied. Objective lens 402, field lens 404, and eye lens 406 may be implemented, for example, to function as a motionless zoom lens to provide a variable focal length and direct light 110 onto image plane 310.

FIGS. 5a and 5b illustrate a top perspective view and a side view of a tunable lens 500 in accordance with an embodiment of the present invention. Tunable lens 500 includes a substrate 502 and a lens 504. Substrate 502 may be made, for example, of glass or plastic or other desired material to support lens 504.

Lens 504 may be made, for example, of nematic liquid crystal as known by one skilled in the art. Lens 504 made from liquid crystal may provide a low cost tunable lens that may be manufactured using conventional semiconductor processing techniques. One or more conductors 508 (e.g., a transparent conductor such as indium tin oxide (ITO)) may be included in tunable lens 500 to allow an external bias 506 (e.g., a variable voltage source) to be applied to lens 504.

As an example, in accordance with an embodiment of the present invention, under an external direct current (DC) bias, the nematic liquid crystal molecules realign to the electric field to effectively change the refractive index of the lens material of lens 504 and, thus, change the focal length of tunable lens 500 (or zoom lens which incorporates tunable lens 500). Consequently, for example, by varying a voltage level of external bias 506, the index of refraction of lens 504 is varied, which varies the focal length of a zoom lens employing tunable lens 500.

Tunable lens 500 may also include a lens 510 (e.g., a fixed focal lens). Lens 510 may be incorporated into tunable lens 500 as an integral part of tunable lens 500. For example, lens 510 may be formed by diffusion, deposition, spin-on polymers through lithographic patterning, or other techniques as known by one skilled in the art.

In accordance with an embodiment of the present invention, field lens 104, objective lens 202, field lens 304, or objective lens 402 may be implemented as described for tunable lens 500. For example, if tunable lens 500 includes lens 510, then tunable lens 500 may be substituted for tunable field lens 104 and imaging lens 106 of FIG. 1. Thus, techniques discussed for making tunable lens 500 may be applied to tunable lenses described herein (e.g., in reference to FIGS. 1–4) to provide positive and negative lenses having tunable focal lengths.

A zoom lens incorporating a tunable lens as described herein, in accordance with an embodiment of the present invention, may provide for example a varying amount of magnification (e.g., variable magnification up to three times or more). The effective focal length may for example be controlled by an external bias, which may vary from one volt to twenty volts or more, depending upon the desired application or magnification requirements (e.g., to provide an electro-optical zoom lens).

In accordance with an embodiment of the present invention, a motionless zoom lens is provided which incorporates a tunable lens as one of its lens components. The zoom lens may provide an optical system having a continuously variable focal length, but this is not limiting. For example, the image plane may remain in a fixed position or may require refocusing at each incremental focal length (e.g., as with vari-focal lenses).

In general, in accordance with an embodiment of the present invention, a motionless zoom lens is provided which is based on controlling or varying an effective index of refraction of one or more of its lens components. Consequently, no mechanical motion or physical repositioning of one or more lens components within the zoom lens is required.

The tunable lens, in accordance with an embodiment of the present invention, may be provided as a liquid crystal-based tunable lens. However, a liquid crystal-based tunable lens is not limiting and the tunable lens may be implemented by other types of materials whose effective refractive index is variable. For example, a piezoelectric material or a non-linear optical axis dependent birefringence material may be employed along with suitable corresponding techniques for controlling the change of effective refractive index of the selected lens material. For example, a variable focal lens may be made of a non-linear optical material, with the focal length of the zoom lens incorporating the variable focal lens controlled by turning the non-linear optical material from one optical axis to another without physically pushing, pulling, or sliding the variable focal lens along the direction of magnification (i.e., the variable focal lens is not moved toward or away from the other lens components as in a conventional zoom lens).

For example, in accordance with an embodiment of the present invention, rather than implement tunable lens 500 within a zoom lens, a tunable lens may be implemented with an optical non-linear material having a variable refractive index. As an example, the tunable lens may incorporate a piezoelectric material or a non-linear optical crystal. The non-linear optical crystal (e.g., a crystal 602 as described in reference to FIG. 6) will have a different index of refraction along different optical axes (e.g., an x, a y, and/or a z axis of crystal 602). The variation of the index of refraction can be controlled, for example, by turning the non-linear optical crystal from one optical axis to another.

Figure 6:
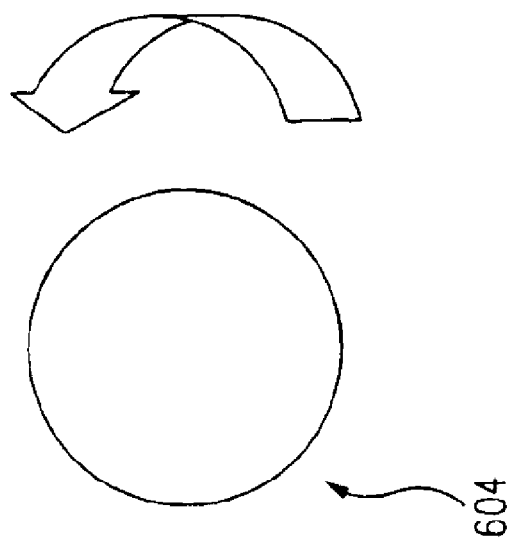
FIG. 6 illustrates a non-linear crystal and a tunable lens in accordance with an embodiment of the present invention.
Figure 6:
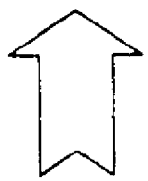
Figure 6:
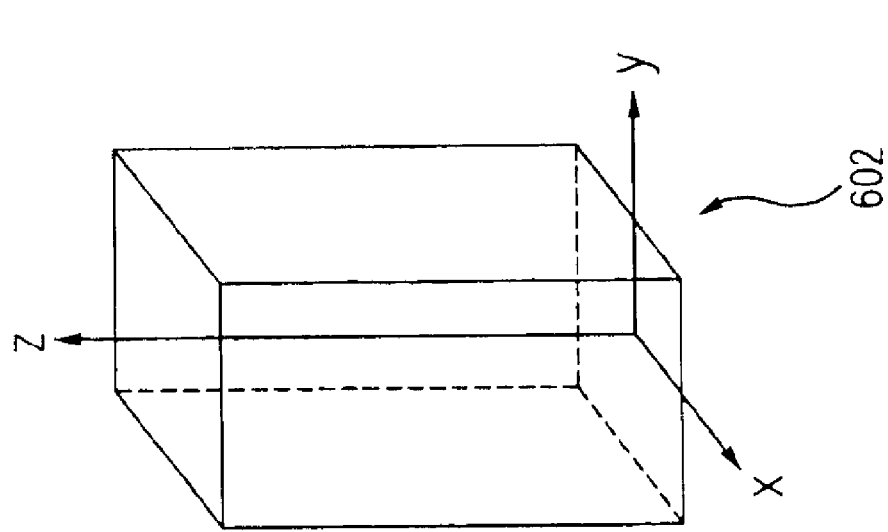

For example, FIG. 6 illustrates a representation of a non-linear optical crystal 602 and a tunable lens 604 in accordance with an embodiment of the present invention. Tunable lens 604 may be made of a non-linear optical crystal (e.g., such as crystal 602) that has a different index of refraction along one or more of its axes (i.e., as with crystal 602). For example, tunable lens 604 may be rotated (e.g., as illustrated in FIG. 6) to change the index of refraction and, consequently, the magnification of a zoom lens incorporating tunable lens 604. As an example, tunable lens 604 may be rotated from the x axis to the y axis or from the x or y axis to the z axis to provide an incremental or continuously variable index of refraction.

Tunable lens 604 may be substituted for field lens 104, objective lens 202, field lens 304, or objective lens 402 in corresponding FIGS. 1 through 4 to provide zoom lens 100 through 400, respectively. Thus, tunable lens 604 would be rotated to provide a different index of refraction, rather than varying a voltage bias as described herein. In general, rotating tunable lens 604 to provide a different index of refraction may offer certain advantages (e.g., in terms of size, weight, etc.) over conventional techniques of mechanically moving lens components back and forth to vary a separation distance between zoom lens components.

Crystal 602, as illustrated in an exemplary fashion in FIG. 6, may be shaped, cut, or formed to a shape similar to tunable lens 604 (e.g., a ball lens). Tunable lens 604 may be, for example, a KDP crystal, a KTP crystal, a $\beta$-$B_aB_2O_2$ crystal, an $L_iB_3O_5$ crystal or any other type of non-linear optical crystal as known by one skilled in the art. For example, the KDP crystal may have an index of refraction of $n_o$=1.4938 (e.g., for the z axis) and $n_e$=1.4599 (e.g., for the x or y axis), the KTP crystal may have an index of refraction of $n_{z=c}$=1.8305, $n_{x=a}$=1.7395, and $n_{y=b}$=1.7367 (e.g., for the z, x, and y axis, respectively), the $\beta$-$B_aB_2O_2$ crystal may have an index of refraction of $n_o$=1.6551 (e.g., for the z axis) and $n_e$=1.5425 (e.g., for the x or y axis), and the $L_iB_3O_5$ crystal may have an index of refraction of $n_{z=c}$=1.6055, $n_{x=a}$=1.5656, and $n_{y=b}$=1.5905 (e.g., for the z, x, and y axis, respectively).

As an example, tunable lens 604 may represent a ball lens made of the $\beta$-$B_aB_2O_2$ crystal. By rotating tunable lens 604, the index of refraction may be varied along the optical axis. For example, tunable lens 604 may be situated to provide an index of refraction of $n_e$=1.5425 (e.g., along its optical y axis) to provide one level of magnification within a zoom lens. Tunable lens 604 may then be rotated to provide an index of refraction of $n_o$=1.6551 (e.g., along its optical z axis) to provide a different level of magnification.

Embodiments described above illustrate but do not limit the invention. It should also be understood that numerous modifications and variations are possible in accordance with the principles of the present invention. Accordingly, the scope of the invention is defined only by the following claims.

I claim:

1. A zoom lens for a camera the zoom lens comprising: a first lens comprised of a nematic liquid crystal and adapted to provide a variable index of refraction; and a second and a third lens, wherein the first lens, the second lens, and the third lens are situated in fixed positions to provide a focal length for the zoom lens, with the focal length variable based on the index of refraction of the first lens.

2. The zoom lens of claim 1, wherein the first lens is a tunable field lens, the second lens is an objective lens, and the third lens is an image lens.

3. The zoom lens of claim 2, wherein the first lens further comprises a substrate comprised of a glass or a plastic.

4. The zoom lens of claim 3, wherein the first lens further comprises conductors for providing the voltage level to the liquid crystal material.

5. The zoom lens of claim 3, wherein the substrate is formed by at least one of a diffusion, a deposition, a spin-on polymer, and a lithographic patterning technique.

6. The zoom lens of claim 1, wherein the focal length is varied by varying a voltage level provided to the first lens which varies the index of refraction of the first lens.

7. The zoom lens of claim 1, wherein a magnification of the zoom lens is determined solely by the index of refraction of the first lens.

8. A zoom lens comprising:
   a first lens adapted to provide a variable index of refraction; and
   a second lens, wherein the first lens and the second lens are situated in fixed positions to provide a focal length for the zoom lens; with the focal length variable based on the index of refraction of the first lens, and wherein the focal length is varied by rotating the first lens which varies the index of refraction of the first lens.

9. The zoom lens of claim 8, wherein the first lens comprises a non-linear crystal.

10. The zoom lens of claim 9, wherein the non-linear crystal comprises at least one of a KDP crystal, a KTP crystal, a $\beta$-$B_aB_2O_2$ crystal, and an $L_iB_3O_5$ crystal.

11. The zoom lens of claim 8, further comprising a third lens.

12. The zoom lens of claim 11, wherein the first, second, and third lens function as a field lens, an objective lens, and an image lens, respectively, for the zoom lens.

13. The zoom lens of claim 12, wherein the zoom lens is incorporated into at least one of a camera, a telephone, and a personal digital assistant.

14. An optical device comprising: a first lens comprised of a nematic liquid crystal material; a second lens and a third lens situated in a fixed positions relative to the first lens such that light passes through the first lens, the second lens and the third lens of the optical device; and wherein the first lens is adapted to provide a variable index of refraction to provide a variable focal length for the optical device, with the first, second, and third lens functioning as a field lens, an objective lens, and an image lens, respectively, for the optical device.

15. The optical device of claim 14, wherein the optical device is incorporated into at least one of a camera, a personal digital assistant, and a telephone.

16. The optical device of claim 14, wherein the index of refraction of the first lens is varied by varying a voltage applied to the first lens.

17. A method of varying a focal length of a motionless zoom lens for a camera, the method comprising: providing a first lens having a variable index of refraction and comprised of a nematic liquid crystal material; providing a second lens disposed a fixed distance from the first lens; and varying the index of refraction of the first lens to vary the focal length of the zoom lens, wherein the variation of the focal length is determined by the index of refraction.

18. The method of claim 17, further comprising providing a third lens, wherein the first lens, the second lens, and the third lens function as a field lens, an objective lens, and an image lens, respectively.

19. The method of claim 17, wherein the varying operation is performed by tuning the index of refraction of the nematic liquid crystal material within the first lens.

* * * * *